United States Patent [19]
Le Boudec et al.

[11] Patent Number: 6,044,075
[45] Date of Patent: Mar. 28, 2000

[54] APPARATUS AND METHOD FOR ROUTING A COMMUNICATION IN A NETWORK

[75] Inventors: Jean-Yves Le Boudec, Jouxtens-Mézery, Switzerland; Antoni B Przygienda, Bethesda, Md.

[73] Assignee: International Business Machines Corporation, Armonk, N.Y.

[21] Appl. No.: 08/669,569

[22] PCT Filed: Dec. 15, 1994

[86] PCT No.: PCT/EP94/04159

§ 371 Date: Aug. 13, 1996

§ 102(e) Date: Aug. 13, 1996

[51] Int. Cl.⁷ .......................... G01R 31/08; G06F 11/00; H04L 12/66

[52] U.S. Cl. .......................... 370/351; 370/351; 370/354; 370/234; 370/235; 395/200.68; 395/200.69; 395/200.71

[58] Field of Search .................. 370/354, 351, 370/229, 235, 234, 252, 352, 488; 395/200.71, 200.68, 200.69, 200.7; 340/825.02, 825.03, 825.5, 826, 827; 369/488

[56] References Cited

U.S. PATENT DOCUMENTS

| | | | |
|---|---|---|---|
| 4,905,233 | 2/1990 | Cain et al. | 370/94.1 |
| 5,142,531 | 8/1992 | Kirby | 370/94.3 |
| 5,233,604 | 8/1993 | Ahmadi et al. | 370/60 |
| 5,491,690 | 2/1996 | Alfonsi et al. | 370/60 |
| 5,615,254 | 3/1997 | Qiu et al. | 379/221 |

*Primary Examiner*—Michael Horabik
*Assistant Examiner*—Man Phan
*Attorney, Agent, or Firm*—Gerald R. Woods

[57] ABSTRACT

A method and apparatus creates a set of routes for use in assigning the optimum route for a communication in an ATM digital broadband communication network consists of one or more links, each link connecting one node in the network to one other node. Assignment of a route is made from a set of. Each optimum route in the set is that route offering the best possible value of an additive attribute of the network, such as signal delay, number of nodes or route cost, for a particular minimum acceptable value of a restrictive attribute of the network, such as bandwidth of the route. The calculation of the optimum route involves finding the best route with respect to the value of the additive attribute for a model or representation of the network containing only those links in the network having at least a particular value of the restrictive attribute. The network model is then further reduced to one having only links with a more limiting value of the restrictive attribute, and the optimum route for this network model is calculated. Thus a set of optimum routes is computed, each for a model of the network with successively fewer links which satisfy successively more stringent requirements on the restrictive attribute. More than one list may be used, each list ranking the links in the network in order of a different restrictive attribute. The set of optimum routes is preferably calculated prior to receipt of a request for a route.

13 Claims, 5 Drawing Sheets

APPARATUS AND METHOD FOR ROUTING A COMMUNICATION IN A NETWORK

FIELD OF THE INVENTION

The invention relates to the transfer of information within a network, e.g. a digital broadband telecommunication or computer network. More specifically, the invention concerns an apparatus and method for routing information from one node in an information network to another node in the network.

The invention is preferably applicable to Asynchronous Transfer Mode networks. An Asynchronous Transfer Mode (henceforth "ATM") network permits the transfer of digital information from any one access point within it to any other access point. These access points are referred to as the nodes of the network.

ATM networks have been used widely in the prior art for traditional telecommunications and computer-computer communication. It is expected that ATM networks which support broadband communication will be chosen increasingly in the future for interactive communication and for the dissemination of information. Examples of these uses which already exist are video-on-demand, interactive games, home-banking, home-shopping, remote study, PC/PC- and client/server links. ATM networks are ideally suited to data transfer tasks lying within the fields of "multi-media" and "information super-highway" communication.

BACKGROUND OF THE INVENTION

The section of a network which directly connects two nodes without including any other node is termed the link between those nodes. In most networks a node is connected by such direct links to only a few other nodes, these often being nodes which are spatially or geographically close to it.

When communication must be provided between any two nodes in a network to facilitate the transfer of data between them, a "route" must be provided between them. A request for a communication is usually made by a user located at one of the network's nodes who requests immediate provision of a route to one other single node in the network. The route assigned will consist of one or more links. There are usually very many possible routes between any two nodes, each of these routes passing through different sets of intermediate nodes and each therefore consisting of a different combination of links.

The problem which the present invention solves concerns selecting and assigning the optimum route for communication between any two nodes in a network. One aspect of this problem concerns exploiting the network's carrying capacity efficiently in the assignment of routes. Another aspect of this problem is the provision of the optimum route sufficiently quickly after a request is made that the user making the request does not have to wait and delay the planned communication significantly.

ATM networks which are presently used must respond to a request for the assignment of a route between any two nodes. This is done in some prior art networks by the following steps, or a variation thereof, performed in the order a)–c):

a) waiting until a request for a route is received.
b) analyzing the nature of the request to decide which constraints are present, e.g. what is the bandwidth which the route must have.
c) identifying which of the routes between the two nodes satisfying the constraints in the request should be assigned. This calculation usually seeks to minimize one parameter, e.g. the financial cost of the route, or the delay in the route. The result of this calculation is the optimum route for the particular request which was made.

The calculations in step c) must be made for a very large number of possible routes.

Methods such as that given above are only usable for small networks where very few constraints can be made in the request. Typically only one constraint can be specified. If these conditions are not met then the calculation of which route to assign takes too much time for "real time" assignment of routes and is too expensive. For networks with very many links the calculation can become intractable, i.e. could not be completed within many years on even a very fast computer.

At least one prior art document has attempted to overcome these difficulties by performing the calculation mentioned above before the request for a route has been received. See the document "SNA Networks of Small Systems" from the IEEE Journal on Selected Areas in Communications discussed below. However, although by pre-calculating some or all of the routes there is effectively more time available in which to perform the calculation, the calculation itself becomes more complicated. This is because the following elements of the problem are not known before the request is submitted:

a) the constraints attached to the route request:
b) how much of the network will be in use when the request is made, and therefore how much spare capacity each link in the network will actually have available when the real request is received.
c) between which pair of nodes communication will be required.

Therefore optimum route calculations need to be made for various hypothetical constraints, load factors and pairs of nodes which might be applicable to a future request.

No prior art method has offered an affordable and complete solution to carry out these calculations for real networks of the kind which will be encountered in ATM communications systems.

The following are known prior art systems where route assignment is necessary or is described:

IEEE INFOCOM '92, pages 2A.2.1–2A.2.6 (0153–0158) by M. AIDA et al.: "Optimal routing in communication networks with delay variations". This paper adopts a statistical approach to minimizing the path delay. The mean and variance of path delay are plotted graphically, and an algorithm is applied to these values in order to find the optimum path.

IEEE Journal on Selected Areas in Communications, vol. SAC-3, No. 3, May 1985, pages 416–426 by A. E. BARATZ et al.: "SNA Networks of Small Systems". This article describes route selection in terms of calculation of the optimum route from one node to every other node in the network. The selection leads to each node holding a database of optimum routes to all the other nodes for certain "classes" of service. In determining these optimum routes, each link in the network is considered to have multivalued properties, e.g. bandwidth or delay. These properties are used to determine the suitability of a link for a particular class of service. This is done using "weights" assigned to each link, where the value of the weight is a measure of the suitability of the link for the class of service under consideration and the value of the weight is set at zero for a link which is inappropriate for that class of service. A single class of service weight is assigned to each link or node to cover all its characteristics, with the result that the optimum route calculation lacks the precision of the method of the present invention. This lack of rigorousness may lead the method to miss a satisfactory route when one in fact exists. There is no attempt to exhaustively derive the set of optimum routes for all possible values of route constraints.

U.S. Pat. No. 5,088,032 concerns routing communications in a computer network. A metric is calculated for a possible route which depends, e.g. on the delay and the inverse of the bandwidth of links in the route. Other characteristics can be included in this metric, depending on the characteristics required of the route. In fact, the metric assigns a measure of relative importance to each of the requirements of a communication, such as high bandwidth, low delay or high reliability. Minimization of this metric to select the optimum route therefore is not mathematically rigorous, i.e. it does not lead with certainty to the optimum route and is an approximation. Furthermore, the metric is used as the basis for deliberately splitting traffic amongst several paths through the network in dependence on the value of the metric, and thus teaches away from the single route solution employed in the present application.

EP-A-0 398 614 discloses a method of routing data within a network. Lists of the optimal "next link" for any final destination node are compiled for each positive attribute, e.g. an entry on one list states which link should be chosen if starting from the present node, wanting to communicate with a particular final destination node and being interested in minimizing hop count. These lists do not correspond to those of the present invention, where entire optimum routes are stored after a process of route selection. The method of EP-A-0 398 614 furthermore aims only to deal with the decision as to which node to use next from the node which a communication has currently reached, rather than determining the entire route before beginning transmission. This incremental approach leads away from the idea of a pre-calculation of complete optimum routes and then sorting these routes as is achieved by the present invention. EP-A-0 398 614 also envisages sending the control information relating to the data being transmitted over a different path than that used for the data itself.

U.S. Pat. No. 5,317,566, published on May 31, 1994, offers a recent solution to the problem of route selection in a network. On receipt of a first route request, a least cost route is calculated and assigned. This route is then held in memory together with the transmission requirements from the route request. When, later, a further request for a route to the same destination is received, the transmission requirements of that request are compared with those stored. If they match, then the stored route is assigned in response to the new request.

The solution offered by U.S. Pat. No. 5,317,566 starts from the premise that time can be saved in route assignment by storing the last route used, because the transmission requirements of a route request are likely to be the same as those of the previous route request. This solution leads to the route held in memory not being of use if successive route requests have different transmission requirements. Furthermore, no thorough pre-calculation and sorting of a set of optimum routes is carried out.

In a further development, the arrangement of U.S. Pat. No. 5,317,566 calculates a second "next best" route at the time of calculating the least cost route, and stores this together with the least cost route actually used. If any link of the stored least cost route is unavailable at the time of receipt of a later route request with the same transmission requirements, then this next best route can be assigned. This aspect of the arrangement of U.S. Pat. No. 5,317,566 teaches away from the arrangement of the invention of the present application.

SUMMARY OF THE INVENTION

In principle, the invention is based upon a method of deriving routes within a network, selecting a set of these routes which bear a particular relationship to one another, and assigning a route from this set in response to a request for communication between any two nodes in the network. The invention also comprises an apparatus for carrying out this method.

Each link in a network has attributes, i.e. characteristics inherent to the link. Usually links have some attributes which must be added up over the whole length of a route to give their effective value for the route. An example of such an attribute is delay. Therefore the total delay of a route between two nodes is the sum of the delays of all the links in the route. Such attributes will henceforth be referred to as additive attributes. Links also usually have some attributes which are of such a nature that the lowest value of that attribute for all the links in a route determines the value of that attribute for the whole route. An example of such an attribute is the bandwidth of a link, the lowest bandwidth of any of the links in a route determining the bandwidth of the whole route. Such attributes will henceforth be referred to as restrictive attributes.

For any given pair of nodes within a network and any additive attribute, the method and apparatus of the invention enable the compilation of a set of optimum routes. Each route in this set is the optimum with respect to one additive attribute, e.g. cost, for one or more particular values of a restrictive attribute, e.g. for a specified minimum acceptable forward bandwidth.

The method and apparatus of the invention may be employed to compile the set of optimum routes after receipt of a request for a route. Preferably however, they are employed to compile the set prior to receipt of the request, such that the set of optimum routes need only be consulted as a form of "look-up" table when a route request is received.

The advantage of the invention over the arrangements of the prior art is that optimum routes can be found in networks whose size and complexity prevented prior art methods from determining optimum routes in a usefully short time period. Furthermore, prior art approaches do not always carry out an exhaustive calculation to find the optimum route in a network. The method and apparatus of the invention in contrast to this find and assign the optimum route having, in effect, checked all possible routes.

The method and apparatus of the invention result in there being few routes for which the parameter optimization calculation, e.g. an additive attribute minimization such as selection of the cheapest route, must be performed in comparison to the total number of potential routes in any network. The number of calculations which need to be performed for a given size of network is so low with the method of the invention that the optimum routes can be found and assigned for networks which contain at least an order of magnitude more links than networks which can be handled by the methods of the prior art.

The method and apparatus of the invention use the classification of attributes given above: each link is considered to have one or more additive attributes and one or more restrictive attributes. It is therefore possible to set up a list of links which has been ordered according to the value of one of the attributes.

Specifically, in accordance with the present invention a separate list of links is compiled for each restrictive attribute, with all the links in the network being placed on the list in sequence according to the value of that restrictive attribute for that link. Each list is compiled with the link having the most limiting value of restrictive attribute first. The remaining links are listed in order of decreasing degree of constraint, e.g. in order of increasing bandwidth. The method and apparatus of the invention find the optimum route repeatedly for successively smaller models of the network, each network model having been reduced with respect to the previous one by removal from it of the next link on the link list. The "model" referred to here is any representation of the network which shows the features of the network. This model must be such as to enable simulations of changes to the network to be made, e.g. the removal of a link from the network to be simulated, and subsequent calculation of the properties which the network would have in this changed form. Any optimum route found may be added to a "set" of optimum routes if it is better according to certain criteria than routes already stored in the set. This procedure is repeated until all the links have been removed from the link list. At the end of this selection procedure, the set of optimum routes contains all those routes which provide an optimum value of the additive attribute, e.g. minimum delay, for a particular value of restrictive attribute, e.g. for a specified minimum bandwidth. The set of optimum routes is then consulted when a request for a route is received and a route from the set which meets the criteria contained in the request is assigned.

In accordance with the present invention an apparatus is provided for routing a communication between a source node and a destination node in a digital broadband communication network via a route which is optimum with regard to at least one route characteristic, the apparatus comprising:

a) means for defining a first route characteristic to be optimized for a pair of selectable source and destination nodes;

b) means for defining a minimum acceptable value of at least a second route characteristic;

c) means for determining that route which is optimum with respect to said first route characteristic from amongst all routes between said pair of nodes which can be constructed using only links in the network having at least said minimum acceptable value of said second route characteristic, whereby the determination is repeated for successively higher minimum acceptable values of said second route characteristic;

d) means for storing the optimum routes so determined;

e) means which, upon receipt of a request for communication between said pair of source and destination nodes, choose the route which has the best value of said first route characteristic from amongst those routes stored for this pair of nodes which have at least the minimum value of said second route characteristic required by the request; and f) means for sending the communication to be transmitted along this chosen route.

Also in accordance with the present invention, an apparatus is provided for deriving the optimum routes between a first node and other nodes in a communications system, starting from a model of the whole system and a list of the internodal links available in the system, this link list having the links ranked in order of decreasing severity of a limitation imposed by a characteristic of the link on its use, the apparatus comprising:

a) means which apply to the model of the system a so-called Spanning Tree Algorithm for finding the shortest spanning tree in terms of an additive route characteristic between said first node and each of said other nodes in the system;

b) means for storing resulting routes if they are either strictly better than or not comparable to all previously stored routes, and discarding any previously stored routes which are strictly worse than said resulting routes;

c) means for eliminating the first link, and any links equivalent to it, from said link list;

d) means for removing from the model of the system the link or links removed from said link list;

e) whereby the various means specified under a)–d) above are such as to repeat their said functions in the sequence a)–d) until there are no more links left on said link list.

Further in accordance with the present invention, a method for routing a communication between a source node and a destination node in a digital broadband communication network via a route which is optimum with regard to at least one route characteristic can comprise the steps of:

a) for a pair of selectable source and destination nodes, defining a first route characteristic to be optimized;

b) defining a minimum acceptable value of at least a second route characteristic;

c) determining that route which is optimum with respect to the said first route characteristic from amongst all routes between said pair of nodes which can be constructed using only links in the network having at least said minimum acceptable value of said second route characteristic;

d) repeating step c) for successively higher minimum acceptable values of said second route characteristic;

e) storing the optimum routes so determined;

f) upon receipt of a request for communication between said pair of source and destination nodes, choosing the route which has the best value of said first route characteristic from amongst those routes stored for this pair of nodes which have at least the minimum value of said second route characteristic required by the request; and g) sending the communication to be transmitted along this chosen route.

According to a preferred embodiment, the first route characteristic can be an additive route characteristic, whose sum along a route between the source node and the destination node is that route's total additive characteristic.

According to a preferred embodiment, the second route characteristic is a restrictive characteristic, whose lowest value along a route between said source node and said destination node is said route's total restrictive characteristic. This restrictive characteristic can be an indication of the bandwidth transferable over a link in the route, in particular the inverse of said bandwidth. The route with the lowest bandwidth indication is therefore the optimum route with respect to transferable bandwidth.

Further in accordance with the present invention, a method for deriving the optimal routes between a first node and other nodes in a system, starting from consideration of a model of the whole system and a list of the internodal links available in the system, this link list having the links ranked in order of decreasing severity of a limitation imposed by a characteristic of the link on its use, can comprise the following repeatedly executed sequence of steps:

a) applying to the model of the system a so-called Spanning Tree Algorithm for finding the shortest spanning tree in terms of an additive route characteristic between said first node and each of said other nodes in the system;

b) storing resulting routes if they are either strictly better than or not comparable to all previously stored routes, and discarding any previously stored routes which are strictly worse than said resulting routes;

c) eliminating the first link, and any links equivalent to it, from said link list;

d) removing from the model of the system the link or links removed from said link list;

e) repeating steps a)–d) until there are no more links left on said link list.

In a preferred embodiment of the invention, the characteristic of the link is a restrictive attribute of the link. In a further preferred embodiment of the invention, two lists of internodal links are set up, the links on each list being ranked in order of decreasing severity of limitation imposed by a characteristic of the link on its use, the characteristic being different for each list; and steps a) to d) in the previous paragraph are repeated such that when a link is removed from the first of the said lists and the model of the system, the shortest spanning tree is found repeatedly, each of these repetitions being for a model reduced by the next link on said second link list. There can be more than two link lists, the shortest spanning tree being calculated for all possible permutations of partially reduced link lists.

Examples of additive route characteristics are:

a) the delay of the signal within a link, the sum of the delays over the links of a route being that route's total delay and the route with the lowest total delay being the optimum route with respect to signal delay;

b) the number of nodes existing along a route, the route with the lowest total number of nodes being the optimum route;

c) the cost of transfer along a route, the route with the lowest total cost being the optimum route.

If one of several additive attributes may be specified in a route request, then separate sets of optimum routes, each set optimized with respect to one of the additive attributes which may be specified, should be calculated. If the set of routes is calculated at the time of receipt of the request however, only a single set of optimum routes, these routes being optimized with respect to the additive attribute specified in the request, need be calculated.

These and other novel features believed characteristic of the invention are set forth in the appended claims. The invention itself however, as well a preferred mode of use, and further objects and advantageous thereof, will best be understood by reference to the following detailed description of illustrative embodiments when read in conjunction with the accompanying drawings.

DESCRIPTION OF THE DRAWINGS

The invention is described in detail below with reference to the following drawings.

MODES FOR CARRYING OUT THE INVENTION

A first preferred embodiment is discussed below which illustrates a simplified application of the invention in general terms.

Embodiment I

In this embodiment, a network will be considered where the links only have one restrictive attribute and where only one additive attribute is of relevance to the users of the network.

The sorting method forming part of the invention is summarized below:

1) The method of the invention begins by considering all possible routes between two of the network's nodes under the condition that the entire network is available, i.e. that all links in the network are available to form part of the route between the two nodes. In this case, a calculation is made of the optimum route for one of the additive attributes. For example, the route with the least delay between the two nodes can be calculated. The route resulting from this calculation is now stored as the first member of a set of optimum routes, together with the information that it has been arrived at without there being any constraints on any of the restrictive attributes.

2) An ordered list of all the links in the network is now considered. For the purposes of illustration, the restrictive attribute will be taken to be the bandwidth "b" of the link. There are a total of "t" links in the network. The ordered link list begins with the most constrained link, e.g. that with the least bandwidth. Assume that this link has bandwidth b0, and that the remaining links are listed in order of increasing bandwidth b1,b2,b3 . . . bn . . . bt. Assume also that no two links in the network have the same bandwidth.

3) Further calculations are made for a model of the network. This network model initially comprises all the links in the network. The first link on the link list is now deleted from the link list, and is also removed from the model of the network for the purposes of further calculations. The remaining network consists of all the links which are less constrained in the restrictive attribute than was the link which was deleted, i.e. all links with more bandwidth than b0.

4) The optimum route between the two nodes with respect to the additive attribute is now calculated for the newly reduced network model. The route resulting from this calculation, henceforth route "P", is placed in the set of optimum routes if it fulfills certain criteria. In this simple case the criteria are that route P, in comparison to each route remaining in the set after P has been checked against all routes in the set, either:

a) has better bandwidth and worse delay than the route in the set; or b) has better delay and worse bandwidth than the route in the set.

Whilst checking P against all routes in the set of optimum routes, some members of this set may be found to be worse than P. Such members are removed from the set and discarded. The definition of the condition "worse than" is explained in connection with the algorithm at the end of Embodiment II below. After P has been checked against all routes in the set, if either condition a) or condition b) above holds against each member of the set, then P is placed in the set of optimum routes, together with the information that it is the optimum route under the condition that bandwidth b must be greater than b0 stored together with it.

5) Now the next link is deleted from the link list and removed from the network model. This means the removal of the link of bandwidth b1, leaving the list and the network consisting only of links of bandwidth more than b1. The optimum route with respect to the additive attribute is now calculated for this reduced network. The result of this calculation is now added to the list of optimum routes, if it fulfills the conditions given under point 4) above, together with the information that it is the optimum route for the restrictive constraint that the bandwidth of the route must be greater than b1.

6) The procedure in step 5 is now repeated for all the remaining links on the link list, until there are too few links left on the list for any route between the two nodes to be constructed.

The set of optimal routes now includes routes which both:
a) link the two nodes; and
b) each provide the minimum possible delay for a given constraint on route bandwidth.

The method outlined above leads to a streamlined procedure for ascertaining which routes between two nodes would be optimum with respect to one additive attribute under various constraints on only one restrictive attribute. This method can be applied to all pairs of nodes in the network between which communication may be requested. The set of optimum routes then forms a reference table. When a request for communication between any pair of nodes is received, the set is scanned and the route with the minimum delay between these nodes which can support the bandwidth specified in the request is tried first.

Requests for routes can be envisaged which contain two or more constraints. In this variation of embodiment I, route optimization must now take account of the two restrictive attributes of each link corresponding to these constraints. If there are two or more restrictive attributes to be considered for each link then further lists of links, each ordered according the values of a different one of the restrictive attributes, must be set up. Assume that there is a second list of links, ordered according to decreasingly restrictive values of a restrictive attribute "c". The selection outlined in steps one to six above is then repeated, but including an extra loop. This extra loop is such that the calculation of the optimum route made at the point of removing each link on the link list bn . . . bt is made repeatedly, in fact for networks from which successively the links c0,c1,c2 . . . cn . . . ct are removed. The method therefore now consists of nested loops of calculations of the optimum route.

The set of optimum routes at the end of this procedure contains routes which are optimum with respect to the additive attribute, e.g. route delay, for a particular combination of minimum acceptable values of two restrictive attributes. This set of optimal routes can be worked out prior to receipt of a request for a route. A route request can now contain two restrictive criteria and still be met by simply selecting the route from the set of optimal routes which meets those criteria. This method can be extended to more than two restrictive attributes in a similar manner.

The calculation of optimum route performed at each stage of the method of the present invention where a link has been removed from the network can be performed by any known calculation technique. For example, a "spanning tree" calculation can be performed. Reference should be made to Numerische Mathematik 1, pages 269–271, 1959; E. W. Dijkstra "A note on two problems in connection with graphs" for further details of calculation methods which can be used.

Embodiment II

Figure 1:
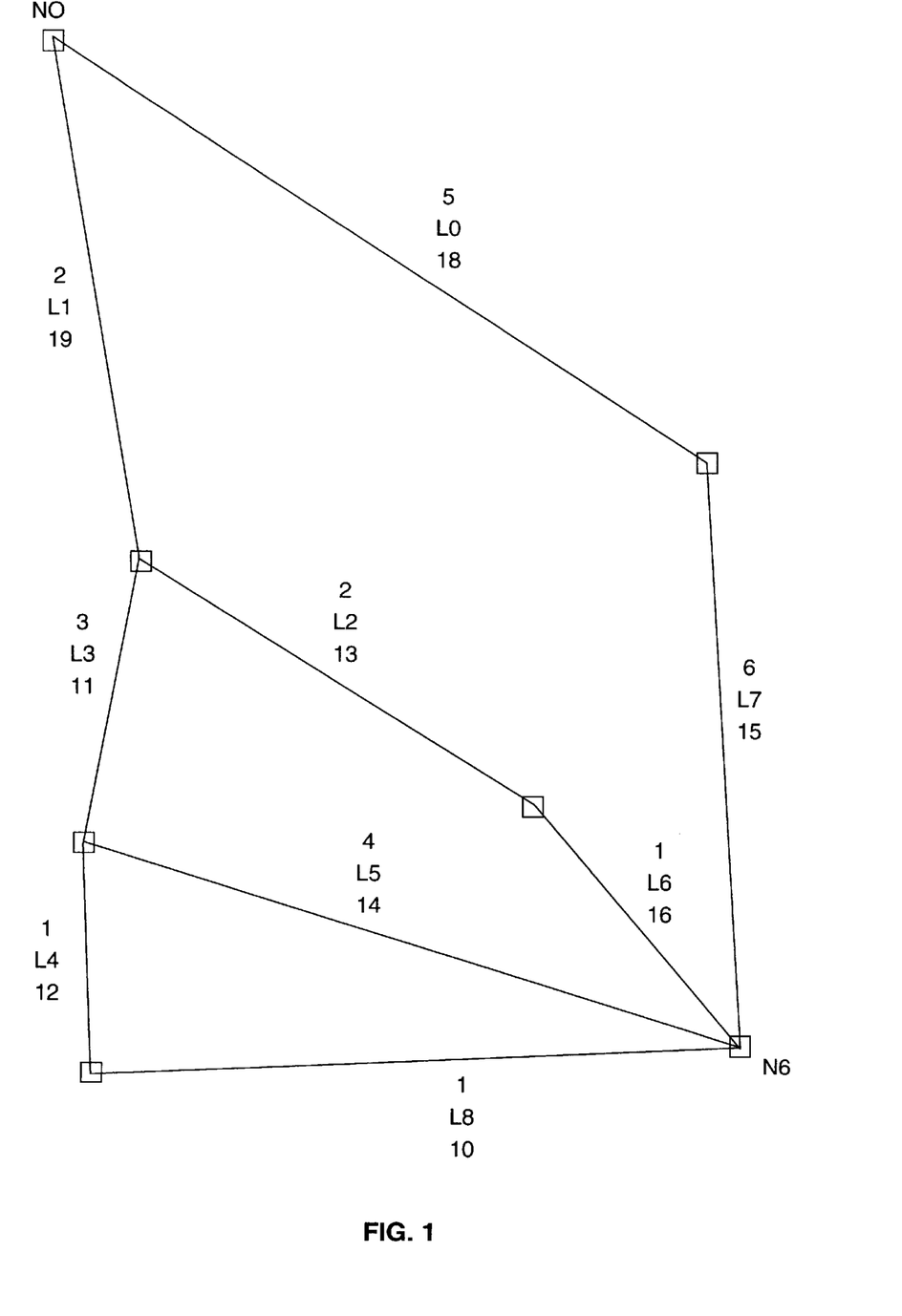
FIG. 1 shows a communications network with internodal links L0–L8 to which the method of the present invention can be applied.

FIG. 1 shows a simplified model of a network. The symbol "N" denotes a node and symbol "L" denotes a link. The network model shown in FIG. 1 is smaller and far simpler than a typical telecommunications or computer network. The network model lacks loops which jump over other loops, but such loops are handled in the same way as shown below.

For the purposes of illustration, the additive attribute will be taken to be the delay for a signal passing through the network. The problem to be overcome by the invention in this example is to find the route between node N0 and node N6 with the minimum delay. For a network, it is usually necessary to consider this problem for all pairs of nodes in the network, in order to be ready to handle a request for connection between any two nodes in the network.

The nine links shown in FIG. 1 each have an additive attribute A which is the delay that a signal passing through the link experiences. The value of the delay is the number printed above the link name L0, L1 etc. Each link also has a restrictive attribute R1, which is the bandwidth of the link in arbitrary units. The value of the bandwidth of each link is the number printed below each link name.

The values of delay and bandwidth of each link are as shown in the following table:

| Link | Delay "A" | Bandwidth "R1" |
|------|-----------|----------------|
| L0   | 5         | 18             |
| L1   | 2         | 19             |
| L2   | 2         | 13             |
| L3   | 3         | 11             |
| L4   | 1         | 12             |
| L5   | 4         | 14             |
| L6   | 1         | 16             |
| L7   | 6         | 15             |
| L8   | 1         | 10             |

The list of links ordered according to decreasing severity of limitation due to the restrictive attribute (here this is therefore in order of increasing value of bandwidth) is thus:

| Link      | L8 | L3 | L4 | L2 | L5 | L7 | L6 | L0 | L1 |
|-----------|----|----|----|----|----|----|----|----|----|
| Bandwidth | 10 | 11 | 12 | 13 | 14 | 15 | 16 | 18 | 19 |

The set of optimum routes will be referred to as<S >.

In order to compile the set of optimum routes, the following steps occur:

1) With the network model still consisting of all links, the route of least delay between node N0 and node N6 is calculated. This can be done by conventional calculation, the person skilled in the art knowing several ways of doing this. The route with minimum delay in fact has a delay of 5 units and is via $$L1 = \ = > L2 = \ = > L6$$

Thus the first entry into the set of optimum routes is this route. As a convenient note form this will be referred to as S1(5,L1,L2,L6,13), as it has a delay of 5 units, involves links L1,L2 and L6 and can support a bandwidth of 13 units.

2) Now the first link is deleted from the list of links, and removed from the network model for all future calculation. This link is link L8, which has the lowest bandwidth of 10 units.

In this simple case, there is no need to recalculate the route of lowest delay. As none of the links of the route L1,L2,L6 have been removed from the list and the network model, this must still be the route of lowest delay.

3) The next step is to remove the next link on the list, which is link L3 with a bandwidth of 11. This link is removed from the network mnodel, and as in step 2) no re-calculation of the route of lowest delay is necessary. Removal of the next link, L4 with bandwidth 12, also causes no change.

4) Next link L2 with bandwidth 13 is removed from the link list and the network model. Our first optimum route through links L1,L2 and L6 is now no longer available. So a re-calculation of the optimum route is necessary. The optimum route which we find now is via $$L0 = = > L7$$

Thus optimum route S2(11,L0,L7,15) is added to the set of optimal routes <S>.

5) Links are removed successively from the list, with re-calculation of the optimum route where necessary, until either the list is empty or until it is clear that no further routes can be established between nodes N0 and N6 with the links remaining on the list. Although this latter state is clear in the present simple example, in real networks it is not possible to know this with certainty, so in practice the links on the link list must usually be deleted until the list is empty.

The set of optimal routes <S> turns out to have only two members:

S1(5,L1,L2,L6,13)
S2(11,L0,L7,15)

This set of optimal routes under particular conditions represents the set of routes which, according to a preferred embodiment of the invention, are held awaiting any request for a connection between nodes N0 and N6.

In accordance with the invention, when a request for connection between nodes N0 and N6 is received, the route with the lowest delay which offers the required bandwidth is allocated. Therefore a request for a route from N0 to N6 with a bandwidth of 9 would be met in the present example by assigning route S1, i.e. the route consisting of L1,L2 and L6. If the route request specified a bandwidth of 14 however, route S2 would be assigned because S1, although it has less delay, cannot support the required bandwidth.

In an alternative to this embodiment the set of routes is derived immediately on receipt of a request for a connection. This offers the advantage that the available bandwidth figures used in the calculation reflect the available bandwidth on each link at that moment.

The method illustrated above is repeated for all pairs of the network's nodes between which communication may be required. When calculation prior to receipt of a request for connection is chosen, a matrix can be created which is preferably organized such that for each pair of nodes in the network, a set of optimal routes for various particular values of restrictive attribute is stored. These routes can be continually re-calculated to "re-fresh" them and thus to make the mismatch to actual available route capacity on the links of the route at the time of receipt of the request as small as possible.

Further improvements to the selection procedure outlined above can be made. These form preferred embodiments of the invention, and are as follows:

1) The example above shows that re-calculation of the optimum route is only necessary when the link removed, that currently first on the link list, is one of the links in the last-calculated optimum route. The re-calculation of the optimum route can therefore be omitted for steps in the algorithm where the link removed from the link list and the network model is not one which was part of the last optimal route.

2) When a link with a particular value of restrictive attribute is removed from the link list, all other links with the same value of that attribute can be removed at the same time. This is because all links with that value of the restrictive attribute which is at this stage no longer acceptable are unable to form part of an acceptable route.

Embodiments I and II both involved the calculation of optimum routes. These are considered to be candidate routes for entry into the set of optimum routes.

The candidate routes are added into the set of optimum routes only if they meet certain conditions. This is decided by making a systematic comparison of the candidate route with the members already in the set of optimum routes. Similarly, at the time of comparing a candidate route to the members of the set of optimum routes, it may be found that certain routes in the set should be removed from the set and discarded.

The conditions for adding a candidate route to the set of optimum routes and for discarding members of that set are the result of the definition of the set of optimum routes. These conditions are most clearly understandable from the algorithm below, which is the procedure to be followed when comparing a candidate route to the existing members of the set of optimum routes.

Definition: A route with additive attribute S and restrictive attribute T is defined as being "strictly better" than a route with additive attribute X and restrictive attribute Y if either (S is better than or as good as X and T is better than Y) or (S is better than X and T is better than or as good as Y).

Now consider a candidate route A. Consider also a set of optimum routes with n members of which the i th member is route Bi. The following algorithm is worked through to decide whether to add route A to the set and whether any of the routes in the set should be removed from the set and discarded:

1) Compare route A to the next member of the set, Bi.

2) If Bi is strictly better than A, then discard A and stop.

3) If A is strictly better than Bi, then remove Bi from the set and discard Bi.

4) Return to step 1) if A has not yet been compared to all n routes in the set.

5) If A has been compared to all n routes in the set and has not been discarded as a result of these comparisons, then place A in the set and stop.

The condition which the above algorithm has detected where some routes Bi remain in the set and route A is added to the set is that A is "not comparable" to the remaining routes in the set. Put in terms of the delay and bandwidth characteristics used in embodiment II, this would mean that there was no route in the set which had either:

1) better bandwidth and better delay than route A; or 2) worse bandwidth and worse delay than route A.

In fact, the set of optimum routes consists of routes which are the "greatest lower bound" of a plot of the routes' characteristics.

Examples of Additive and Restrictive Attributes:

Below is a table which includes further examples of additive and restrictive attributes of links which the method of the present invention can treat in an analogous way to that given in the two embodiments outlined earlier.

| Additive attributes | Restrictive attributes |
|---|---|
| Monetary cost | Forward bandwidth |
| Number of hops | Reverse bandwidth* |
| Length | Number of connections** |
| Delay | Member of a set*** |

*Often a communication on a network requires less bandwidth in one direction than in the other. Examples of this are video-on-demand and home-shopping, where a simple command from a subscriber may pass in one direction to a central data base and a huge amount of data may then be sent to the subscriber in response to this enquiry.
**Where the constraint contained in the request for a route is that the route must not go through any link or node which has more than a certain number of connections on it.
***Where the constraint contained in the request for a route is that the route must only consist of links from a certain set. This constraint equates to starting the method of the invention with an already partly reduced network.

Two or More Restrictive Attributes:

As mentioned earlier, the method of the invention can obtain the set of optimum routes for a network where requests for a connection between two nodes contain two constraints, i.e. where two restrictive attributes must have satisfactory values for a route to be usable. Returning to the numerical example given as embodiment II above, the method of the invention foresees the following additional steps in such a case:

The second constraint constitutes a second restrictive attribute R2, for which a second link list is compiled. Consider now a typical step in the method of embodiment II, such as step 2, where link L8 is removed. If there is a second restrictive attribute which must be considered then at this point the optimum route in the network model must be re-calculated a number of times. The first of these calculations is performed with only L8 removed from the model. Then the first link on the second link list is removed from both the network model and the second link list and the calculation to find the optimum route is repeated. Then the next link on the second link list is removed from both the second link list and the network model, and the calculation repeated. This step and the re-calculation are repeated, adding optimum routes to the set of optimum routes as they are found, until there are no more links on the second link list. Step 2 thus results in a series of optimum routes being calculated, each for the same value of restrictive attribute R1 but for successively more limiting values of restrictive attribute R2.

The second link list must be re-constituted before moving on to step 3 of the method of embodiment II above. Similarly for this step the calculation of optimum route must be repeated after removal of each successive link on the second link list, but this time starting from a network model lacking both links L8 and L3.

Terminology Used for Restrictive Attributes:

Calculation of the better value of the additive attribute involves comparison of two numbers, the lower value of which is the better, e.g. a route delay of 46 ns is better than a delay of 63 ns. In order to make comparisons of values of restrictive attribute into a comparison where the lower numerical value needs to be found, the indication of restrictive attribute in embodiment III will be expressed as the inverse of the numerical value of the restrictive attribute. Therefore the indicator of bandwidth in embodiment III, which follows, is the inverse of the actual bandwidth on the route. The table below shows, as an example, such an indicator for three of the links of FIG. 1. The "bandwidth indicator" has been taken to be one hundred times the inverse of the bandwidth.

| Link | Bandwidth | "Bandwidth indicator" |
|---|---|---|
| L0 | 18 | 5.555 |
| L1 | 19 | 5.263 |
| L2 | 13 | 7.692 |

Embodiment III

When pre-calculating optimum routes in a real network, it is usually the case that the requests for routes received by the network can be for connection between any two nodes in the network.

Figure 2:
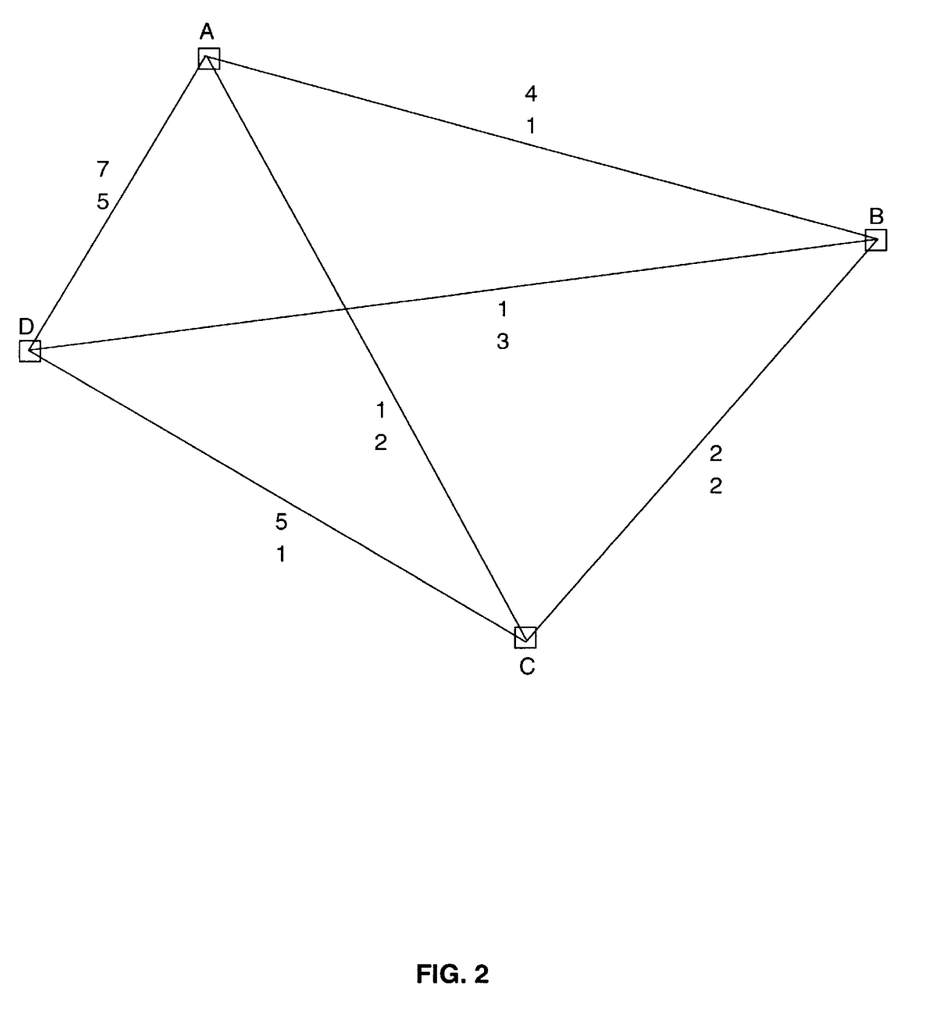
FIG. 2 shows a second communications network, where the problem to be solved is to find the routes from a node "A" to all the other nodes.

In a further development, the present invention has the surprising advantage that it can provide a set of optimal routes from one node in a network to all other nodes in the network by means of one algorithm similar to that explained earlier in relation to embodiments I and II. This capability of the invention will be explained by means of the following example:

FIG. 2 shows a network with four nodes A,B,C and D. Each node is connected to all the others in the network by a link. The two numbers beside each link are the delay (upper number) and the bandwidth indicator (lower number). The bandwidth indicator is proportional to the inverse of the bandwidth, so a smaller number represents a link with a larger or less limiting bandwidth.

The following table shows the link list, i.e. all the links in the network arranged in order of increasing limitation of the restrictive attribute. Note that with the bandwidth indicator used being proportional to the inverse of the bandwidth, the route with the numerically highest bandwidth indicator is first on the list, and the links are listed in order of decreasing bandwidth indicator.

| Link from/to | Delay, Bandwidth Indicator |
|---|---|
| A/D | 7,5 |
| B/D | 1,3 |
| B/C | 2,2 |
| A/C | 1,2 |
| C/D | 5,1 |
| A/B | 4,1 |

The method of the invention now proceeds to determine the set of optimum routes from node A to all the other nodes in the network, taking as the starting point the whole network and the link list given above. The steps to do this are as follows:

1) At first no bandwidth constraint is made, so the first determination of optimum routes only has to consider the whole network and the delay of each link. Considering the whole network, the optimal routes from node A to the other three nodes in the network are found by simple calculation to be as follows:

| Start and finish | Route | Delay, Bandwidth Indicator |
|---|---|---|
| A to B | A,C,B | 3,2 |
| A to C | A,C | 1,2 |
| A to D | A,C,B,D | 4,3 |

These three routes are thus the first three entries into the set of optimum routes. In a real case, the shortest "spanning tree" must be calculated between node A and each destination node.

Figure 3:
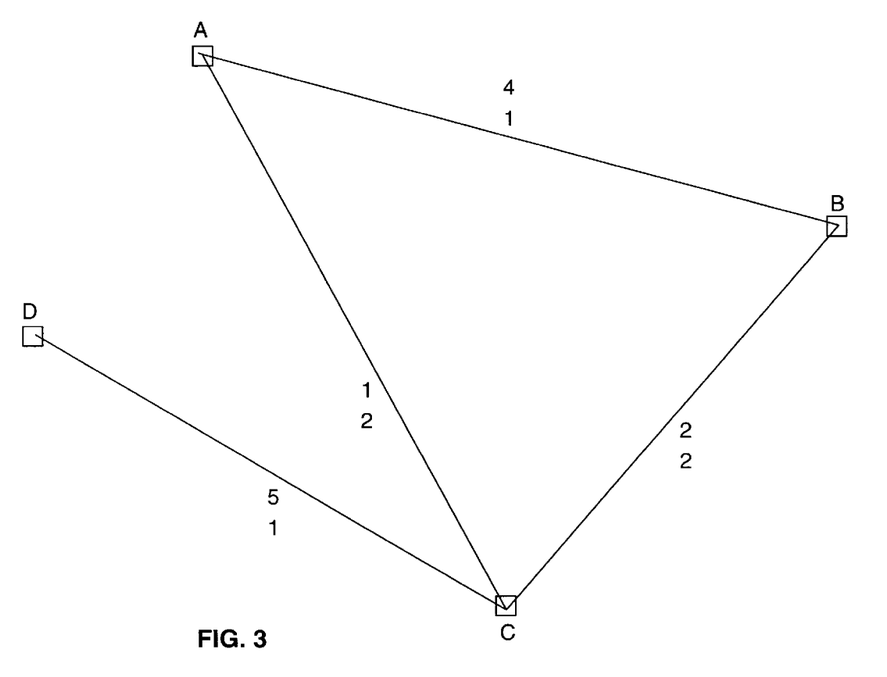
FIGS. 3–6 show reduced versions of the network of FIG. 2, these being models of the network which are used at various stages of the derivation of the optimum routes from node "A" to the other nodes in the network.

2) Now the first link on the link list is removed from the network model and the link list. This is link A/D. The resulting network model is shown in FIG. 3. The optimum routes for this reduced network are now calculated. There is no new optimum route, as can be recognized from the fact that link A/D was not included in any of the three members in the set of optimum routes. In fact, the removal of the link A/D has not changed the shortest "spanning tree" between any of the nodes in the network.

Figure 4:
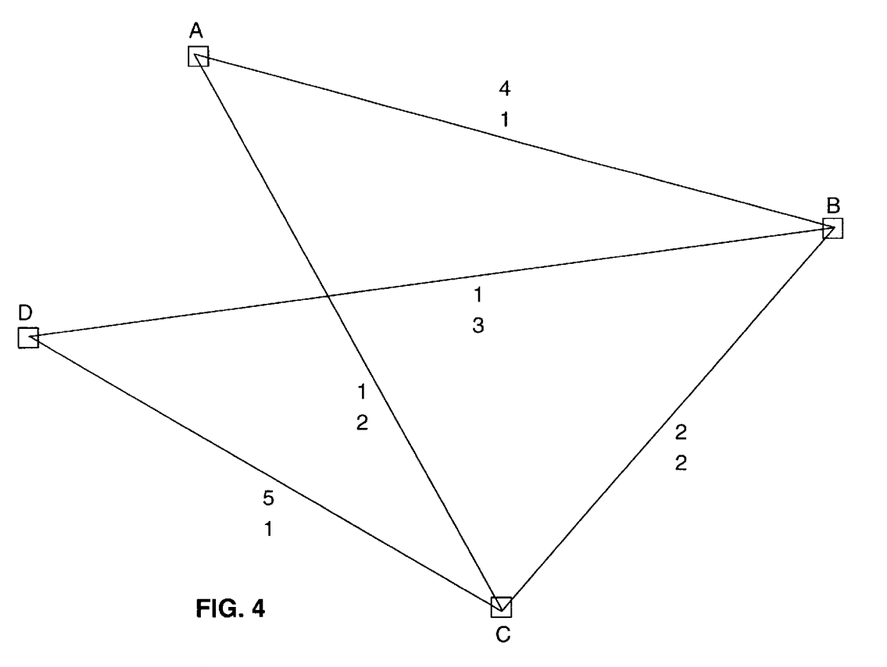

3) Now link B/D is removed from the link list and the network model. See FIG. 4. The calculation of the optimum routes in this reduced network model gives a new optimum route A,C,D with delay 6 and bandwidth indicator 2 from node A to node D. This optimum route is thus entered in the set of optimum routes.

Figure 5:
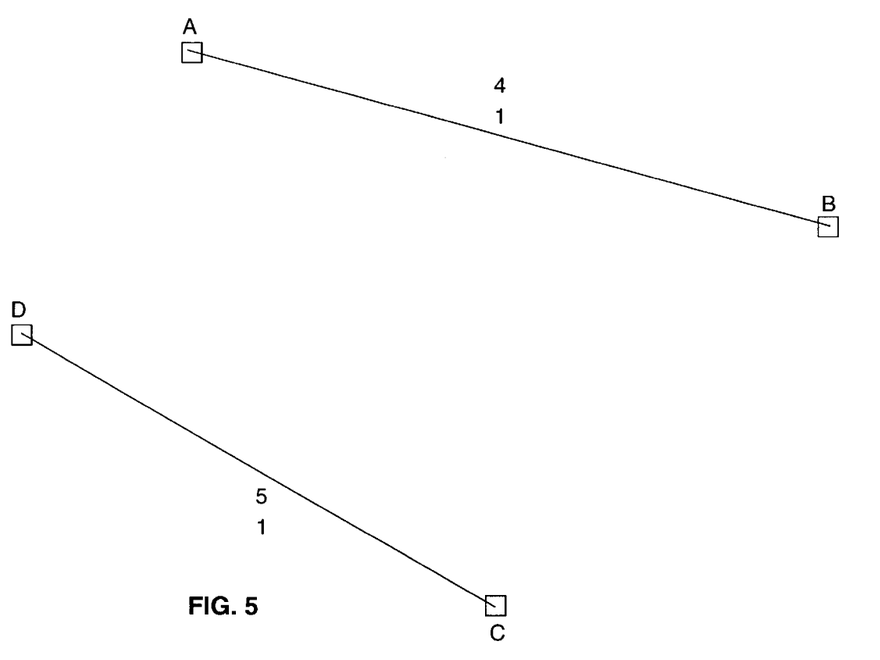

4) Link B/C is now removed from the list and the network model. At the same time, link A/C is removed from the list and the model as it has the same bandwidth as link B/C. See FIG. 5. Recalculation of the optimum routes shows that the new optimum route from A to B is the direct link A/B with delay 4 and bandwidth indicator 1.

Figure 6:
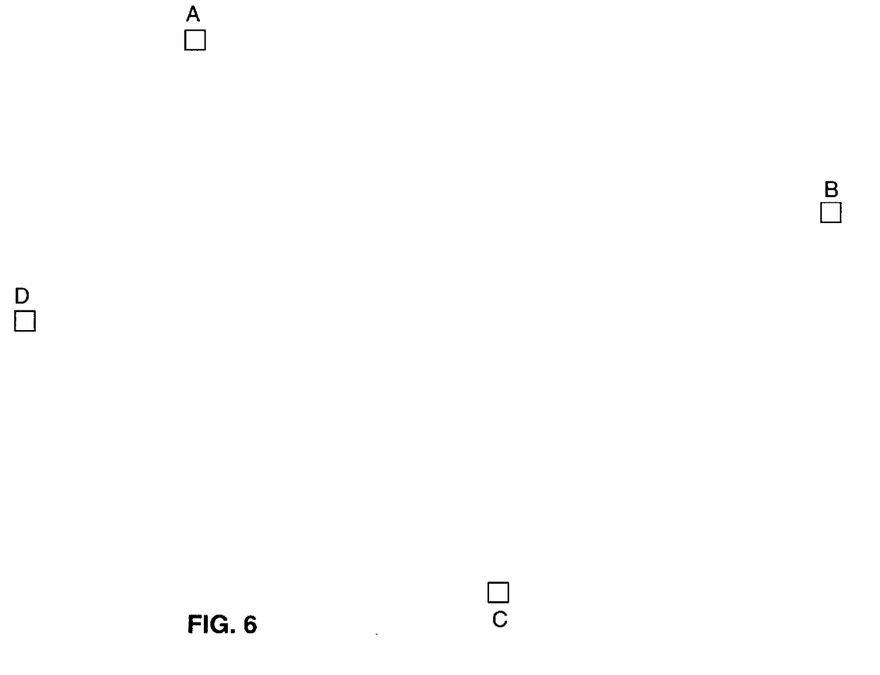

5) Removal of links C/D and A/B now empties the link list, which stops the selection of further optimum routes. This is illustrated in FIG. 6.

6) The final set of optimum routes is now:

| Start and finish | Route  | Delay, Bandwidth |
|------------------|--------|------------------|
| A to B           | A,C,B  | 3,2              |
| A to B           | A,B    | 4,1              |
| A to C           | A,C    | 1,2              |
| A to D           | A,C,B,D| 4,3              |
| A to D           | A,C,D  | 6,2              |

This set of optimum routes is now stored. When a request for a route is received, the set is consulted. There are only one or two routes on this list for each pair of nodes. From these one or two routes, the route is assigned which meets the minimum bandwidth requirement in the request and which has the minimum delay. Thus a pre-computed set of optimum routes can be consulted at the time that a route request is received, and the route assigned to the requestor in a very short time.

APPARATUS ACCORDING TO THE INVENTION

Figure 7:
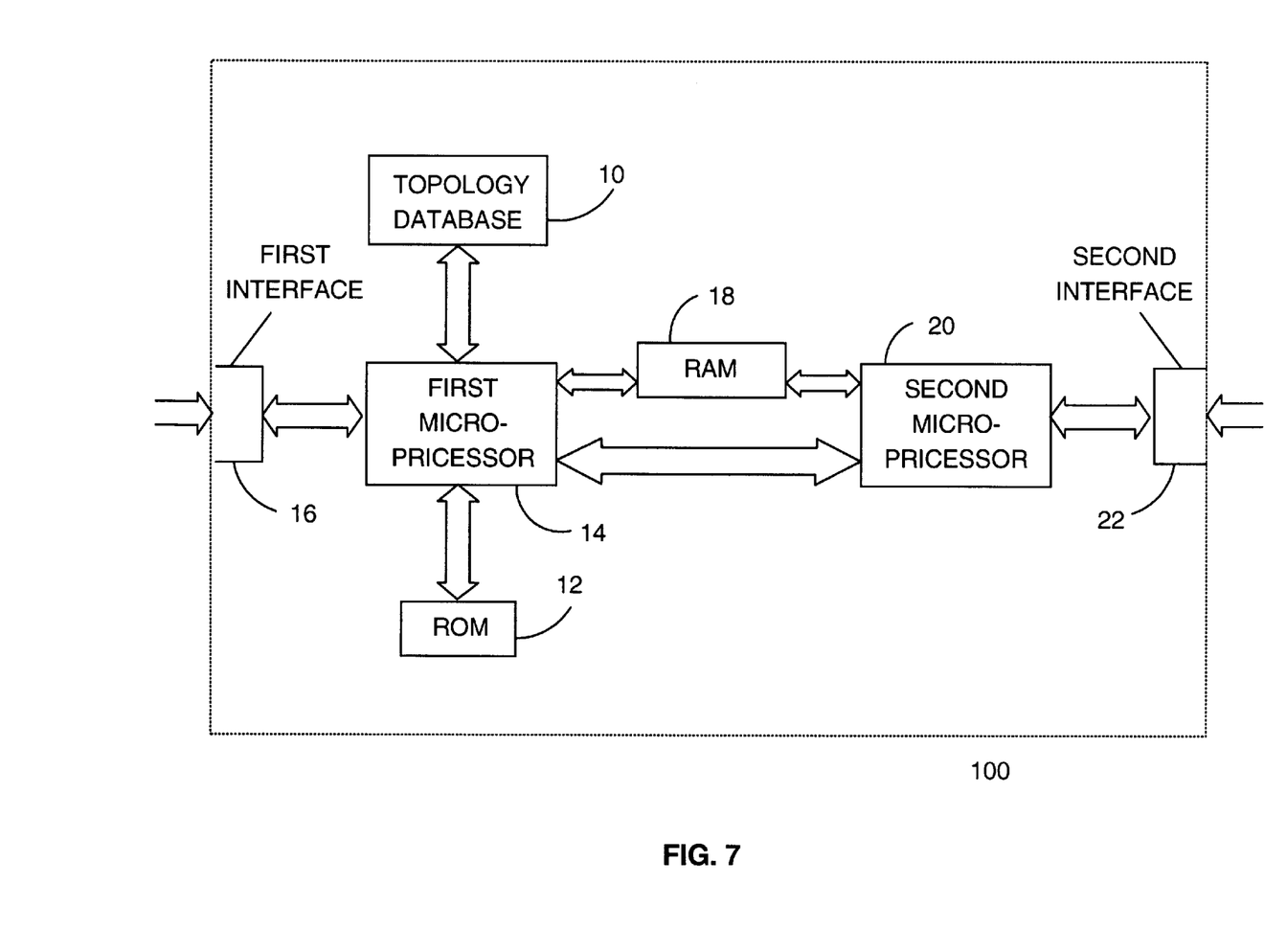
FIG. 7 shows an apparatus in accordance with the present invention.

An apparatus falling within the terms of the present invention is illustrated in FIG. 7. This apparatus comprises means for carrying out route calculation, selection and assignment in response to routing requests according to the methods of the present invention outlined in embodiments I–III above. This apparatus comprises the elements enclosed within the dashed box labelled 100 on FIG. 7. The following general elements, identified by the reference signs used on FIG. 7, make up the apparatus:

a) A database 10. The database holds information on the topology of the network. This information includes details of the fixed structures and properties of the network such as link and node maps, and details of the known characteristics of the links. Predictions or past records of likely "in use" and "available" link capacity are also stored.

b) A read-only memory or ROM 12. This memory can be erasable. The ROM stores the optimum route calculation algorithms, e.g. a Spanning Tree Algorithm, for the method according to the invention.

c) A first microprocessor 14. The first microprocessor calculates and selects the optimum routes according to the methods of the invention. The "network model" and link lists used in the method are created by and held in this microprocessor.

d) A first interface 16 for receiving updates on the state of the network, e.g. link-state updates and details of constructional changes to the network.

e) A random access memory (RAM) 18. The RAM stores the set of optimum routes generated in the first microprocessor.

f) A second microprocessor 20. The second microprocessor receives incoming route requests from network users. In accordance with the requirements of the route request, the second microprocessor selects a route from the set of optimum routes stored in the RAM. This route is then assigned to the user to facilitate the required communication.

g) A second interface 22 for receiving route requests from users and transmitting assigned routes to users.

Elements a)–g) may either be co-located in a network node or located centrally. Alternatively, elements a)–g) could be distributed at various sites throughout the network.

It is emphasized that the apparatus of FIG. 7 shows only one possible mode of implementing the apparatus according to the invention. The scope of this disclosure and the invention encompass all equivalent computing arrangements which are structured or programmed so as to implement the route calculating, sorting and assigning techniques of the present invention.

ADDITIONAL FEATURES OF THE INVENTION COMMON TO ALL EMBODIMENTS

The derivation and storage of the set of optimum routes for the network may be performed by any standard computing means. It is only necessary that the set of optimum routes be available, either locally or remotely, for consultation by the route assignment means which receives requests for routes within the network.

Part of the network model can be a summary of the individual links within a region, i.e. a topology condensation, which contains only information about the border of the region and the properties of the region over paths between the border and destinations within the region. This is a "peer group" in an ATM network. The network can also have an external route injection. This shows a node with routes attached which have a cost but gives no further details.

The method of the invention can be used in broadcast or in multi-cast topologies, i.e. it is not restricted to ATM networks in which one node seeks a communication route to only one other node.

In order to provide a more complete account of the principles of the theory of routes, the following detailed mathematical treatment is provided. Following this, a version of an algorithm for implementing a method in accordance with the invention is listed.

MATHEMATICAL TREATMENT OF PATHS IN NETWORKS

Consider a graph. The graph has a large number of vertices, each of which represents a node in a communications network. The graph also has many edges. Each edge connects two vertices on the graph. Each edge therefore represents a link in the communications network. Each edge on the graph has two weights assigned to it: one represents the available capacity (i.e. bandwidth) of a link in the network, the other one represents the delay of the same link. Thus the edges and vertices of the graph give us a structure which represents our network in mathematical form and upon which we can perform calculations.

The interesting paths for routing an ATM communication through such a network are those paths between pairs of source- and destination nodes which have least possible delay and most capacity. These routes are termed the "extremal" routes. Generally, there exists a set of such extremal routes from each source node to each destination node, these routes each having different delays and capacities. The extremal routes are not "comparable" to each other because each one has either less delay at less bandwidth or more delay at more bandwidth than each of the others. The goal of the method explained here is to compute all extremal paths.

In order to be able to make computations on the graphs, it is necessary to define some terms and some operators:

METRIC: A metric is a mathematical structure defined on the graph. A metric consists of a set of directed edges E(s,d) from source "S" to destination "d" and a set of vertices "V". A metric has four main components which define it: cost, length, path and optimal path. It is not necessary here to go into the axioms which must be met for a metric to exist, but the four components need to be understood.

COST c: A weight function $R^1$ assigns a cost to an edge. The cost may have several components. The cost is a variable associated with a link which is a measure of the contribution it will make to any route in which that link is included. We take here each component of the cost to be a positive non-zero number.

An example of a cost vector $R^2$ which might be assigned to each edge on $$\text{the graph is the vector} \begin{pmatrix} \#\text{hops} \\ \text{delay} \\ \text{reliability} \end{pmatrix}$$

The cost of an edge E is indicated as c(E).

PATH. A path from one vertex to another is any list of connected links, i.e. edges, with no loops in it.

Two operators are needed for the definitions of length and optimum path:

OPERATOR ∪. The operator ∪ is a symbol which indicates the action of combining the costs of the edges which it operates on. Thus using ∪ on all the edges in a path leads to the effective cost of the whole path. It can for example stand for simple addition, if the cost is one which is simply additive over a whole path.

COMPARISON ≼ The comparison symbol indicates that two paths are comparable with one another. This can be understood by considering two paths, each of which has a delay and a bandwidth. If the delay and bandwidth of one path are either both better or both worse than those of the other path, then the paths are said to be comparable. If the delay of one path is better than the delay of the other path but its bandwidth is worse, then the paths are said to be not comparable. Generally, the ≼ symbol can be considered as indicating that the two paths concerned both have a common property. The paths referred to in this discussion correspond to the routes dealt with in the invention of the present application.

LENGTH The length l of a path π follows from the definitions above. It is the total of the lengths of all the edges in the path. The length can simply be considered as an extended cost function:

$$l(\pi) = c(\pi) = c(x_0, \ldots, x_L) = c(E(x_0, x_1)) \cup \ldots \cup c(E(x_{L-1}, x_L))$$

OPTIMAL PATHS. A path is optimal if there exists no better one. To understand this situation, consider two paths $\pi_1$ and $\pi_2$ Using the form $$\text{introduced above:} \begin{pmatrix} \#\text{hops} \\ \text{delay} \\ \text{reliability} \end{pmatrix}$$

the costs of $\pi_1$ and $\pi_2$, expressing the reliability numerically as a bit error rate, are:

$$c(\pi_1) = \begin{pmatrix} 3 \\ 2 \\ 10^{-9} \end{pmatrix} \text{ and } c(\pi_2) = \begin{pmatrix} 4 \\ 10 \\ 10^{-12} \end{pmatrix}$$

For these values we see that these paths are not comparable, because $\pi_1$ has fewer hops and better delay than $\pi_2$, but much lower reliability, i.e. its bit error rate is higher.

Mathematically expressed, no other path is comparable to an optimum path π'. So the relation $$\text{not } (c(\pi) \preccurlyeq c(\pi'))$$

must hold for π' and all other paths π.

It is only of interest to consider several optimum paths if a request for a path in a network is going to specify that the path assigned must have a certain quality, e.g. must have a bit error rate of $10^{-10}$ or less. Otherwise it would not be necessary to consider the bit error rate of the paths, and the one path in the whole network with the lowest delay or lowest number of hops would be the only one we would need to calculate and assign.

In networks to which the method and apparatus of the present invention are applied, there are minimum acceptable specifications on the qualities which a path must have for it to meet the requirements of the request. We thus do need to calculate several paths, and these are in fact minima in the solution space which we are considering. The set of optimum routes which we hold ready to assign in response to a route request is the greatest lower bound of this solution space.

Example: a road network.

We can illustrate the above concepts by treating a simpler problem than that encountered in the communication networks which are the subject of this application. Consider a road network consisting of sections of road, each of which links two cities. The only criterion of interest to us is the shortest path between a given pair of cities, i.e. we want to drive the shortest distance possible to get from one city to another.

The vertices on our graph are the cities. An edge linking two vertices I and I+1 is denoted $E(x_I, x_{I+1})$. The cost of the edge between these two vertices, $c(E(x_I, x_{I+1}))$, is simply the length of the road between the two cities. It is easy to see that comparison of two costs is merely a question of deciding which road is the shorter.

Considering now a whole path between a pair of cities, the cost of the path is simply the sum of the lengths of all the road segments which make up the path. The optimum path is that which has the least length, and the calculation to decide this is simply a matter of finding which of the paths between the cities has the least length. In this example there is only one best route between any two cities and this route is the only member in our set of optimum routes.

The table below shows how all the variables in our theoretical treatment are assigned in the case of this road network:

| cost | c | $A \to R_+$ | length of a road segment |
|---|---|---|---|
| cost concancenation | $c_1 \cup c_2$ | $c_1 + c_2$ | length of two road segments |
| cost comparison | $c_1 \preccurlyeq c_2$ | $c_1 \leq c_2$ | which road is shorter |
| length of a path | $c(\pi)$ | $\sum_{l=1}^{L-1} c(E(x_l, x_{l+1}))$ | distance between two cities along a route $\pi$ |
| optimal path | $\pi'$ | $\forall \pi \in \Pi_{i,j} : c(\pi') \leq c(\pi)$ | shortest path between two cities i and j |

Such a case as the above "roads and cities" example is known as the "standard case". In standard cases the paths are always comparable, so one single optimum route between any given pair of vertices always exists. The results and calculations in such cases are intuitively reasonable, as the above case shows.

In communications networks however, the minimum routing requirements which accompany a request add complexity to the problem and its solution. An example with such minimum requirements in a network is illustrated below, where each edge on the graph has assigned to it a delay and a restrictive component representing an indication of the bandwidth of the link in the network which that edge symbolizes.

Example: a network with delay and bandwidth.

Assume that in an ATM network we want to find routes which allow most bandwidth at least possible delay and vice-versa.

The mathematical representation of the ATM network thus consists of a graph, an edge m of which has assigned to it both a variable $m_1$ which represents the reciprocal of the bandwidth of the link and a variable $m_2$ which represents the delay of the link. The reason for denoting the restrictive attribute as the reciprocal of the bandwidth rather than as the bandwidth itself is simply for the sake of consistency: a link with a lower value of this indicator is a better path than another with a higher value, so we can now look for links with better bandwidth by seeking links with lower values of this indicator. This step of finding the best link therefore becomes similar to how we treat other cost indicators, i.e. by looking for the link with the lowest numerical value.

Carrying out the operator $\cup$ for two links now involves two steps: finding the larger of the bandwidth indicators of the two links and adding their delays. Expressed mathematically, for two links m and n:

$$m_1 \cup_1 n_1 = \text{Max}(m_1, n_1)$$

$$m_2 \cup_2 n_2 = m_2 + n_2$$

So a route consisting of two links has as its delay the sum of the links' delays, i.e. of their "additive" attributes, but has the higher of the two links' bandwidth indicators, which is the lowest bandwidth of the two links, i.e. their "restrictive" attributes.

Using the terminology which we introduced above, our mathematical treatment results in the equalities shown in the following table:

| cost | c | $A \to R \times R$ |
|---|---|---|
| cost concatenation | $\begin{pmatrix} m_1 \\ m_2 \end{pmatrix} \cup \begin{pmatrix} n_1 \\ n_2 \end{pmatrix} =$ | $\begin{pmatrix} m_1 \text{ Max } n_1 \\ m_2 + n_2 \end{pmatrix}$ |
| cost comparison | $c_1 \preccurlyeq c_2$ | $m_1 \leq n_1$ and $(m_2 \leq n_2)$ |
| length of a path | $c(\pi) = c(x_{(1,\ldots,x_L)})$ | $\left( \begin{array}{c} \sum_{l=1}^{L-1} E(c_1(x_l, x_{l+1})) \\ \text{Max}(c_2(E(x_1, x_2)), \ldots, c_2(E(x_{L-1}, x_L))) \end{array} \right)$ |
| optimal paths | called here extremal paths | |

In the ATM network, in contrast to the road network discussed earlier, we find that there are optimum routes which cannot be compared to one another. We therefore cannot write that these routes share the property indicated by the comparison operations $\preccurlyeq$. This is because one route offers better delay but less bandwidth than the other. For routing purposes both are of potential interest because each is the optimum route for a particular minimum bandwidth requirement in a route request, so both must be kept in the set of optimum routes.

Expressed in terms of our mathematical treatment:

For two routes $\pi_1$ and $\pi_2$ with $$l(\pi_1) = \begin{pmatrix} m_1 \\ m_2 \end{pmatrix} \text{ and } l(\pi_2) = \begin{pmatrix} n_1 \\ n_2 \end{pmatrix}$$

we find that:

$$n_1 < m_1 \hat{} n_2 > m_2$$

In fact, both of these optimum routes $\pi_1$ and $\pi_2$ are local minima in our solution space.

EXAMPLE OF AN ALGORITHM ACCORDING TO THE INVENTION

A short form of an algorithm according to the invention is presented below. The terminology used is as explained earlier in this application. Additionally, the term $V_s$ is used for the list of links of the graph (or network) sorted according to the "restrictive" metric component. This restrictive metric component corresponds to a restrictive attribute of the network. The link list of embodiment III of the invention gives an example of the sorted link list denoted by $V_s$. The spanning tree computation is performed by, for example, one of the methods outlined in the publication Numerische Mathematik 1, pages 269–271, 1959; E. W. Dijkstra "A note on two problems in connection with graphs" referred to earlier in connection with embodiment I.

Algorithm:

```
EMPTY CANDIDATE LISTS FOR ALL DESTINATIONS;
Spf :=SPANNING TREE OF SHORTEST PATHS FOR
ADDITIVE COMPONENT OF THE METRIC;
For i := 1 TO LENGTH OF Vs Do
If i-TH LINK OF Vs ON Spf Then
Bound := VALUE OF THE RESTRICTIVE COMPONENT
OF THE i-TH LINK OF V;
Spf := SPANNING TREE OF SHORTEST PATHS FOR ADDITIVE
COMPONENT OF THE METRIC WITH LINKS HAVING
RESTRICTIVE COMPONENT < Bound;
For j := 2 TO NUMBER OF VERTICES Do
pth :=PATH TO VERTEXj ON Spf;
REMOVE ALL PATHS π FROM
j-TH VERTEX CANDIDATE LISTS FOR WHICH
pth'S LENGTH ≤ π'S LENGTH;
If NO PATH π IN j-TH VERTEX CANDIDATE
LIST FOR WHICH π'S LENGTH
≤ pth'S LENGTH Then
INSERT pth INTO j-TH VERTEX'S CANDIDATE LIST;
End;/*IF*/
End;/*FOR*/
End;/*IF*/
End;/*FOR*/
```

We claim:

1. An apparatus for deriving the optimum routes between a first node and other nodes in a communications system, starting from a model of the whole system and a list of the internodal links available in the system, said link list having the links ranked in order of decreasing severity of a limitation imposed by a characteristic of the link on its use, comprising:
   a) means which apply to the model of the system a so-called Spanning Tree Algorithm for finding the shortest spanning tree in terms of an additive route characteristic between said first node and each of said other nodes in the system;
   b) means for storing resulting routes if they are either strictly better than or not comparable to all previously stored routes, and discarding any previously stored routes which are strictly worse than said resulting routes;
   c) means for eliminating the first link, and any links equivalent to it, from said link list;
   d) means for removing from the model of the system the link or links removed from said link list;
   e) whereby the various means specified under a)–d) above are such as to repeat their said functions in the sequence a)–d) until there are no more links left on said link list.

2. The apparatus of claim 1, wherein:
   two lists of internodal links are set up, the links on each said list being ranked in order of decreasing severity of limitation imposed by a characteristic of the link on its use, the characteristic being different for each list; and
   the means of features a) to d) of claim 1 repeat their functions such that when a link is eliminated from the first of the said lists and removed from the network model, the Spanning Tree Algorithm is applied repeatedly, each of these repetitions being for a network model reduced by the next link on said second link list.

3. The apparatus of claim 2, wherein there are more than two link lists, and the shortest spanning tree is calculated for all possible permutations of partially reduced link lists in the manner outlined in claim 2.

4. A method for deriving the optimum routes between a first node and other nodes in a system, starting from a model of the whole system and a list of the internodal links available in the system, this link list having the links ranked in order of decreasing severity of a limitation imposed by a characteristic of the link on its use, comprising the following repeatedly executed sequence of steps:
   a) applying to the model of the system a so-called Spanning Tree Algorithm for finding the shortest spanning tree in terms of an additive route characteristic between said first node and each of said other nodes in the system;
   b) storing resulting routes if they are either strictly better than or not comparable to all previously stored routes, and discarding any previously stored routes which are strictly worse than said resulting routes;
   c) eliminating the first link, and any links equivalent to it, from said link list;
   d) removing from the model of the system the link or links removed from said link list;
   e) repeating steps a)–d) until there are no more links left on said link list.

5. The method of claim 4, wherein:
   two lists of internodal links are set up, the links on each said list being ranked in order of decreasing severity of limitation imposed by a characteristic of the link on its use, the characteristic being different for each list; and
   steps a) to d) of claim 4 are repeated such that when a link is eliminated from the first of the said lists and removed from the network model, the Spanning Tree Algorithm is applied repeatedly, each of these repetitions being for a network model reduced by the next link on said second link list.

6. The method of claim 5, wherein there are more than two link lists, and the shortest spanning tree is calculated for all possible permutations of partially reduced link lists in the manner outlined in claim 5.

7. The apparatus of claim 1 or the method of claim 4, wherein the said characteristic of the link is a restrictive attribute of the link.

8. The apparatus of claim 1, wherein the additive route characteristic is the delay of the signal transfer within a link, the sum of the delays over the links of a route is that route's total delay and the route with the lowest total delay is the optimum route with respect to signal delay.

9. The apparatus of claim 1, wherein the additive route characteristic is the number of nodes existing along a route, the route with the lowest total number of nodes being the optimum route.

10. The apparatus of claim 1, wherein the additive route characteristic is the cost of transfer along a route, the route with the lowest total cost being the optimum route.

11. The method of claim 4 wherein the additive route characteristic is the delay of the signal transfer within a link, the sum of the delays over the links of a route is that route's total delay and the route with the lowest total delay is the optimum route with respect to signal delay.

12. The method of claim 4 wherein the additive route characteristic is the number of nodes existing along a route, the route with the lowest total number of nodes being the optimum route.

13. The method of claim 4 wherein the additive route characteristic is the cost of transfer along a route, the route with the lowest total cost being the optimum route.

* * * * *